Patented Oct. 13, 1942

2,298,813

UNITED STATES PATENT OFFICE 2,298,813

TREATMENT OF POLYMER SUBSTANCES

Luther B. Turner, Roselle Park, N. J., assignor to Jasco, Incorporated, a corporation of Louisiana No Drawing. Application October 27, 1938, Serial No. 237,204

6 Claims. (Cl. 260—32)

This invention relates to synthetic polymer materials prepared by the polymerization of olefin substances such as isobutylene, and relates particularly to the "compounding" of the high molecular weight rubbery polymers of the iso-olefines with other substances. More particularly it relates to the methods and apparatus for the treatment of the polymer after the polymerization step, with a minimum of depolymerization of the completed polymer.

It has been found possible to polymerize the gaseous iso-olefine substances of the type of isobutylene into high molecular weight polymers to produce synthetic materials of highly viscous or rubbery character. These materials may have molecular weights ranging from less than 10,000 to 200,000 or more, and their physical properties vary from those of a highly viscous oil to those of a rubbery solid, according to the molecular weight.

These materials are useful for many purposes, both in the form as prepared, in the purified form, and in combination with many other substances such as oils, fillers, pigments, gums, resins, etc., and this is particularly the case with the high molecular weight rubbery forms of the polymer.

The isobutylene polymer material as prepared, especially when the average molecular weight is of the order of 50,000 to 350,000, is a substance having physical properties much like those of rubber, that is, the polymer material is highly elastic like rubber, with similar properties of return to shape after deformation, and similar high strength in tension and compression. Chemically, however, the isobutylene polymer substance is very greatly different from rubber, since the polymer substance is chemically nearly fully saturated, in contrast to the high degree of unsaturation of rubber; the polymer substance is highly resistant to oxidation, in contrast to rubber, which oxidizes readily; the polymer substance does not vulcanize with sulphur as does rubber, and sulphur can be combined with the polymer substance only with great difficulty and under very special conditions. Furthermore, the unsaturated character of rubber permits of vulcanization and perhaps repolymerization after breakdown, whereas the isobutylene polymer substance is difficult to repolymerize after the polymer has been broken down to a lower molecular weight. Another outstanding difference which is in part physical, lies in the fact that, because of the long chain character of the polymer molecule, mechanical forces, especially pressure, break the molecules of the polymer into fragments of much lower molecular weight, and accordingly the polymer behaves in this respect in a wholly different fashion from rubber.

Rubber can be worked upon rolls for the incorporation of pigments and other compounding substances with little or no injury to the rubber; whereas the polymer substance is very sensitive to working upon the rolls, and even a few minutes of pressure working upon the roll mill, may produce so great a breakdown in molecular weight of the polymer as to destroy the usefulness of the material, and accordingly it has been found impossible to handle the material in the manner in which rubber is handled, for the incorporation of auxiliary substances into the polymer mass.

The present invention depends upon the discovery that the Werner and Pfleiderer type of kneading machine, by which is meant a machine which "works" the substance by a pulling action and a traction effect, in a manner analogous to the pulling of taffy (which machine is useless for milling rubber, because of the very great surface exposed to air, and the resulting serious oxidation, and the great difficulty of making the rubber respond to the movements of the knives) is highly efficient and satisfactory for use with the polymer material. This high efficiency and usefulness appears to depend upon the newly discovered fact that whereas pressure destroys the molecules of the polymer very rapidly, tractive or pulling treatment has little or no effect in breaking down the polymer molecules.

Furthermore, the polymer substance is much more sensitive to heat, than is rubber, and an amount of heat which is not only harmless to rubber but also is necessary to soften it, is seriously harmful to the isobutylene polymer material. The usual rubber mills such as the roll type, or the Banbury mixer type, develop large amounts of heat in the body of the rubber, in consequence of the severe mechanical pressure and internal friction, whereas the Werner and Pfleiderer type of kneader, by producing traction only upon the polymer, causes the development of only a small amount of internal heat, an amount sufficiently small to be substantially harmless to the polymer material.

Furthermore, the polymer is enough more "tacky" than rubber to permit the blades of the kneader to get a good grip upon the polymer material for the desired pulling treatment, whereas the rubber has so much less tackiness as to fail to adhere to the blades of a kneader.

Thus the present invention depends upon the discovery that the polymer substance is sufficiently adhesive to permit the kneader blades to apply traction forces to it; upon the further discovery that a sufficiently small amount of heat is generated in the kneader to be harmless to the polymer; the further fact that tractive forces are substantially harmless to the polymer; and the additional fact that after a short period of working, the material assumes a taffy-like character and a very large surface area which is well adapted to absorption of compounding substances such as fluids or solids but is fatal to the character of a rubber compound, because of the large amount of oxidation of the rubber which occurs under such circumstances. This compounding procedure may be utilized for the incorporation into the polymer material of such substances as oils, pigments, fillers, other polymers, rubbery or gummy substances, etc., and in some instances may be used for the incorporation of air or gas into the polymer material.

Thus, an object of the invention is to compound an olefine with other substances with minimum reduction of average molecular weight.

In practicing the present invention the polymer may be prepared by a polymerization procedure which consists in treating the gaseous olefines such as isobutylene with a catalyst, such as boron tri-fluoride, $BF_3$, or aluminum chloride, $AlCl_3$ at low temperatures, ranging from $-10°$ C. down to $-100°$ C. In this procedure it is found that the molecular weight, and with it the character, and degree of solidity of the material, depend upon the temperature at which the polymerization occurs, the lower the temperature, the higher the molecular weight and the more rubbery the polymer.

The polymer as so prepared is usable directly for many purposes, but for other purposes it requires further processing for the compounding therein of various substances and for the purification and removal of by-products, impurities, etc. For certain uses, it is desirable to incorporate into a high molecular weight polymer a substantial portion of oily material.

Example I

A batch of the polymer, which may conveniently be an amount of 200 pounds, is placed in the Werner-Pfleiderer kneader and the kneading operation begun for the incorporation of sufficient oil to produce a compound containing 20% of the polymer in the oil. However, the oil is not added in total quantity at the beginning of the kneading operation, but the addition of the oil is started in practically a drop-wise manner, approximately 1 to 3 gallons of oil being added during the first hour of kneading. If the oil is added at a rate faster than this, the surface of the polymer becomes coated with a continuous film of oil, and the oil is no longer mixed in satisfactorily. Instead the final product will have in it particles of the original polymer containing no oil. After about 3 to 10 hours, a sufficient amount of oil, that is approximately 10 gallons, will have been added to the 200 pounds of Vistanex; and a sufficient softening and permeation of the Vistanex by the oil is obtained so that the rate of the addition of the oil may be speeded up considerably. By the time the 10 gallons of oil have been added, a considerable change in the polymer has occurred and it has assumed a taffy-like consistency and the further amounts of oil can be worked in much more rapidly, the remaining quantity of the oil being conveniently added over the remainder of a time interval which may be approximately 18 hours more or less. Starting with a polymer having an average molecular weight of 150,000, the molecular weight is broken down by the kneading operation no further than to about 110,000, even though the kneading operation is prolonged. In contrast a similar compounding for a much shorter time for the incorporation of a much smaller amount of oil upon the ordinary rubber roll mills caused a breakdown of molecular weight from 150,000 to 64,000, which for many purposes is prohibitively low.

A similar procedure may be utilized for the incorporation into the polymer of pigment and filler substances. Such substances as talc, powdered slate, lime, chalk, asbestos, wood flower, paper fibers, and in fact substantially any of the filler substances may readily be incorporated into the polymer by a similar procedure, and practically any of the inert pigment substances and lakes likewise are readily incorporated into the polymer and compounded therewith.

Example II

A batch of the polymer having an average molecular weight of 100,000 to 150,000 may be placed in the kneader, together with a desired amount of filler or pigment, which may be from 10 pounds of filler or pigment to 100 pounds of polymer, or lesser amounts of polymer and larger amounts of filler and pigment may be used, until a proportion such as 5 pounds of polymer to 95 pounds of pigment or filler may be used. Over the entire range, the polymer and pigment may be put into the kneader together, the kneading operation started, and continued for a length of time of from 2 to 6 hours. If the proportion of polymer is in excess of the proportion of pigment, the operation may conveniently be conducted at room temperature. If, however, the proportion of filler or pigment is greater than the proportion of polymer, the incorporation into the polymer is facilitated by applying heat to the jacket of the kneading machine. It will be noted that the amount of kneading required for the incorporation into the polymer of the solid materials is considerably less than is required for the incorporation of oily materials, and accordingly the breakdown which occurs is considerably less than that which occurs in the incorporation of the oils.

This is in contrast to the situation which obtains either with the rubber mill rolls or the Banbury mixer where a longer time, and more severe working is required for the incorporation of pigment, than is required for the incorporation of oily liquids. Accordingly, an attempt to incorporate the solid pigments and fillers on the rubber rolls or in the Banbury mixer results in much greater and more serious depolymerization and reduction of the molecular weight of the polymer.

The polymer in some instances contains undesired impurities, such as acid bodies, traces of the boron trifluoride catalyst, traces of solvent from the polymerization step, and traces of low molecular weight material. These undesired components are readily removed by a similar kneading procedure in the presence of substantial quantities of water. The type of washing procedure varies according to the molecular weight of the polymer. If the average molecular weight is below 50,000, the washing operation is relatively simple, since the polymer is less rubbery, and to some extent approaches a plastic substance.

Example III

A batch of the polymer material, say 100 pounds, having a molecular weight of 25,000 to 50,000, may be placed in the kneader, and covered with water. A kneading in water for a period of from 1 to 6 hours is sufficient to remove substantially all impurities. It may be noted that with such low molecular weight polymer, there seems to be a small quantity of some substance present in the polymer which serves as an emulsifying agent and an emulsion of the polymer in water is produced rather quickly. The dispersion of the substances into the emulsion form produces a very large surface interface, through which the water-soluble impurities diffuse very rapidly. The emulsion may then be broken by heating the kneader, and the water may then be poured off from the polymer leaving it in pure form free from the various above-mentioned impurities. An amount of water as small as 10% of the amount of the polymer may under these conditions be sufficient for a washing operation, but for complete removal of impurities, larger amounts are sometimes desirable. It may be observed that in this operation, practically no breakdown of the polymer occurs.

In the case of polymer having a molecular weight in excess of 50,000, the rubbery character of the polymer makes a washing operation somewhat less easy.

Example IV

Accordingly, the batch of polymer having a molecular weight of 55,000 to 350,000 may be placed in the kneader, with approximately 10% of its weight of water and the kneading started. At the beginning of the kneading operation, the solid polymer is merely pushed about by the kneading members, but after a time as the kneading proceeds, the polymer takes on a taffy-like character, and is pulled, stretched and kneaded between the blades of the kneading machine. This kneading may be continued for a period of approximately an hour, at the end of which time most of the water will be distributed through the mass of the polymer. Additional water may then be added, in an amount ranging from 10% to 100% of the amount of polymer, and the kneading continued for another hour, after which the excess water may be poured off and replaced with fresh water and the kneading continued for another hour. The procedure of kneading the polymer in fresh charges of wash water is desirably repeated about six times, at the end of which operation the polymer is substantially free from impurities. As in Example III, the material in the kneader may be heated to break the emulsion, the water drawn off and the material further heated until it is fully dried and free from impurities.

It is to be noted that usually the water forms an emulsion within the polymer with water droplets, as the disperse phase, within the mass of the polymer as the continuous phase, the whole being submerged in a body of water in the kneader.

A suitable number of changes of water, with adequate kneading in each change, will cause the resin to become neutral to litmus paper, to congo red paper or to methyl orange solution, and the material becomes tasteless and odorless.

The washing and kneading operations are desirably conducted at ordinary room temperature, or between 40° and 90° F., since it is found that below about 40° F., the emulsion is broken and washing does not occur, and above 90° the emulsion also is broken and the washing does not occur.

At the completion of the washing operation, the residual water present in the resin may be removed by heating the resin above about 90° F., whereupon the emulsion is broken, the water is readily removed, and the resin returned to its original solid state.

In other instances it is found desirable to incorporate into the isobutylene polymer substance various amounts of gummy materials, or other resins both synthetic and natural, or natural rubber.

Example V

For this purpose the desired amount of the polymer substance may be placed in the kneader and the kneading begun, either at room temperature, or at somewhat elevated temperatures as desired. Part or all of the gums, resins or rubber may then be added to the kneader and the kneading continued. Usually it is preferable to knead the polymer alone for a short period of time until the taffy-like state begins to be assumed. The addition of the gummy, resinous or rubbery materials may then occur, in some instances the whole amount of gums, resins or rubbery material may be added directly, especially if the amount is relatively small. Alternatively the added substances may be put into the kneader in relatively small portions, with intervals between additions sufficient to permit of the incorporation of a substantial amount of the first portion before the second portion is added, and the kneading may be continued until a substantially homogeneous mass is obtained.

It is to be observed that the polymerization of the isobutylene molecules produces a compound having a very high molecular weight, and it is believed (although no proof is as yet available) that the polymer consists of a linear chain of carbon atoms united by successive single bonds; the first carbon atom of the chain having three hydrogen atoms attached thereto, the second carbon atom having two $CH_3$ groups attached (the second atom being joined by single bonds to two adjacent carbon atoms); the third carbon atom having attached thereto two hydrogen atoms (in addition to its linkages to adjacent carbon atoms in the chain; the fourth carbon atom having two attached $CH_3$ groups like the second, and so on to the terminal end, at which point there is probably a residual olefine double bond linkage between the last and the next to the last carbon atoms, with the last carbon atom having attached thereto two $CH_3$ groups. Thus each isobutylene molecule having a molecular weight of 56 provides two carbon atoms for the linear chain, and a polymer having a molecular weight of 112,000 has a chain approximately 4,000 carbon atoms long, with about an equal number of carbon atoms in side branches. It will be realized that in a random orientation of such molecules such as necessarily occurs or is obtained during a kneading or milling operation, very severe physical breakdown forces may be applied to the molecules, and they may be torn apart by direct physical rupture. Such a physical destruction does not occur with rubber, because of the much smaller molecular size. Accordingly this invention is based upon the discovery that a pulling or tractive effect which is desired to be indicated by the word "kneading"

as used in the above specification, and in the appended claims means a tractive effect, as distinguished from a pressure effect with its attendant internal friction.

Thus the procedure of this invention provides a simple and convenient step for the processing of the high molecular weight rubbery polymer which results in a thorough incorporation of material into the polymer with a minimum of breakdown of molecular weight.

While there are above disclosed but a limited number of embodiments of inventive concept, it is possible to provide still other embodiments without departure from the inventive concept hereinabove disclosed, and it is therefore desired that only such limitations be imposed upon the appended claims as are stated therein or required by the prior art.

The invention claimed is:

1. In the processing of high molecular weight plastic iso-olefinic polymers the step of kneading the polymers in the presence of an aqueous liquid within a temperature range of 40° F. to 90° F. until the aqueous liquid forms the discontinuous phase of an emulsion with the polymer as the continuous phase.

2. In the processing of high molecular weight plastic iso-olefinic polymers the step of kneading the polymers in the presence of an aqueous liquid within a temperature range of 40° F. to 90° F. until the aqueous liquid forms the discontinuous phase of an emulsion with the polymer as the continuous phase, and thereafter removing a portion of the aqueous liquid and replacing it with fresh aqueous liquid.

3. In the processing of high molecular weight plastic iso-olefinic polymers the step of kneading the polymers in the presence of an aqueous liquid within a temperature range of 40° F. to 90° F. until the aqueous liquid forms the discontinuous phase of an emulsion with the polymer as the continuous phase, then changing the temperature to a value outside of the range of 40° F. to 90° F., breaking the emulsion thereby during continuance of the kneading operation, and removing the aqueous liquid.

4. The processing of high molecular weight olefinic polymers, the step of kneading a polymer having a molecular weight between 10,000 and 350,000 in the presence of an aqueous liquid while maintaining the temperature within the range of 40° F. to 90° F. until a substantial portion of the aqueous liquid forms the disperse phase of an emulsion within the polymer, continuing the kneading until a substantial portion of the first emulsified aqueous liquid has been replaced in the emulsion by additional portions of the aqueous liquid for the removal of impurities in the polymer, and thereafter removing the aqueous liquid and the impurities.

5. The processing of high molecular weight olefinic polymers, the step of kneading a polymer having a molecular weight between 10,000 and 350,000 in the presence of an aqueous liquid while maintaining the temperature within the range of 40° F. to 90° F. until a substantial portion of the aqueous liquid forms the disperse phase of an emulsion within the polymer, continuing the kneading until a substantial portion of the first emulsified aqueous liquid has been replaced in the emulsion by additional portions of the aqueous liquid for the removal of impurities in the polymer, and thereafter removing the aqueous liquid and the impurities, by the step of altering the temperature to a value outside of the range of 40° F. to 90° F. to cause breakage of the emulsion during kneading.

6. The method of purifying a polymer while retaining at least approximately three-quarters of its original molecular weight, comprising the step of applying to the polymer traction, pulling forces in the presence of an aqueous liquid at a temperature within the range of 40° F. to 90° F. to produce a disperse phase, aqueous emulsion in the polymer of the aqueous liquid and then removing the aqueous liquid with impurities, while maintaining at least approximately three-quarters of the original molecular weight of the polymer as determined before purification processing.

LUTHER B. TURNER.